United States Patent [19]

Henderson

[11] Patent Number: 5,447,083

[45] Date of Patent: Sep. 5, 1995

[54] LINEAR LINK SELECTIVELY PROVIDING FOR LOST MOTION

[76] Inventor: Henning M. Henderson, No. 2 Club View, cr. Nigel & Hills Roads, Selection Park, Springs, Transvaal Province, South Africa

[21] Appl. No.: 124,812

[22] Filed: Sep. 21, 1993

[51] Int. Cl.⁶ .................. F02D 31/00; G05G 1/00
[52] U.S. Cl. ................................ 74/586; 74/593; 123/377
[58] Field of Search ............ 74/581, 582, 586, 593; 123/342, 372, 377; 464/29, 162, 169, 183

[56] References Cited

U.S. PATENT DOCUMENTS

| | | |
|---|---|---|
| 2,188,704 | 1/1940 | Claytor . |
| 3,264,899 | 8/1966 | Swan ................................ 74/586 |
| 3,520,380 | 7/1970 | Radin et al. . |
| 3,952,714 | 4/1976 | Weyer . |
| 4,427,398 | 1/1984 | Eisbrecher et al. . |

FOREIGN PATENT DOCUMENTS

| | | |
|---|---|---|
| 814519 | 7/1981 | South Africa . |
| 846876 | 7/1981 | U.S.S.R. ................... 74/581 |

*Primary Examiner*—Richard M. Lorence
*Attorney, Agent, or Firm*—Jones, Day, Reavis & Pogue

[57] ABSTRACT

A linear link is provided which comprises an inner and an outer telescopically movable pair of members in which a catch arrangement is operative between formations on the two members to selectively lock them in one particular telescopic position, or to allow them to move telescopically, thereby providing for a limited and optionally adjustable degree of lost motion between the ends of the linear link. A co-axial solenoid carried by the outer member controls the catch arrangement to provide selectively for rendering it operative or not according to whether or not the solenoid is energised. The linear link may be lockable in either its maximum or minimum degree of telescopic extension.

14 Claims, 3 Drawing Sheets

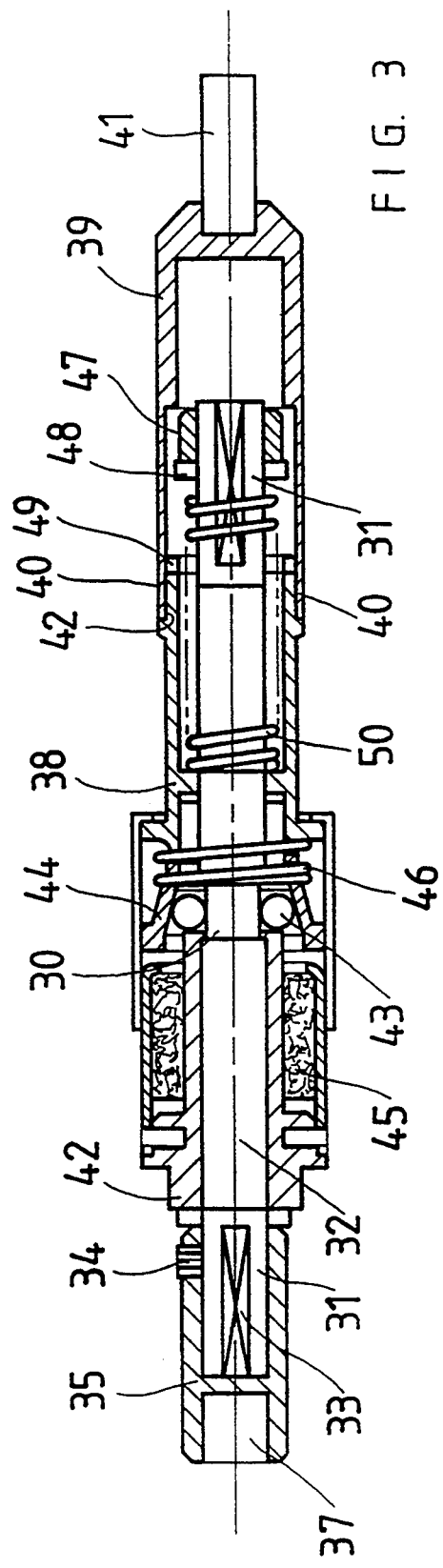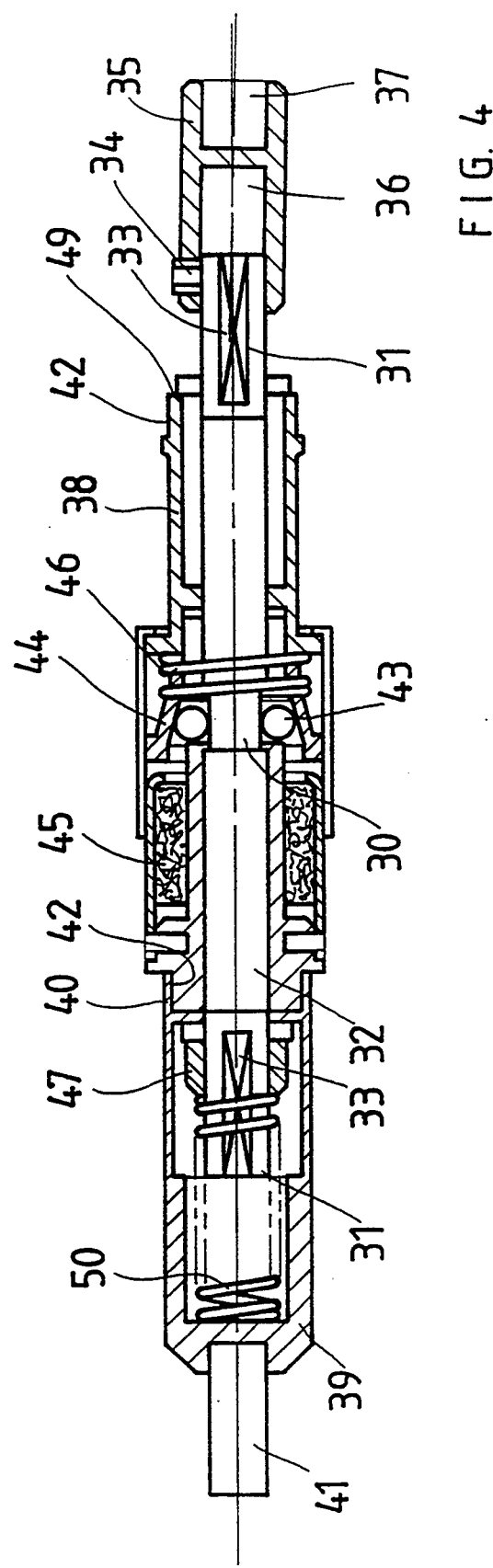

LINEAR LINK SELECTIVELY PROVIDING FOR LOST MOTION

FIELD OF THE INVENTION

This invention relates to a linear link which selectively provides for lost motion in the direction in which the link extends according to predetermined criteria.

The invention also relates to a motor vehicle fuel supply control arrangement embodying such a linear link for selectively limiting the degree to which the fuel supply means or throttle can be opened according to predetermined criteria which are generally associated with abuse or undesirable driving conditions imposed on the vehicle.

BACKGROUND TO THE INVENTION

In certain applications it is desirable that a linear link in a mechanical linkage arrangement be capable of selectively providing for lost linear motion in the direction in which the link extends. This may be required in order to limit, under certain conditions, the movement of a slave end of the link relative to the other end thereof.

One such application is set forth in my South African Patent No. 81/4519 in which I describe a vehicle having a drive engine and fuel supply means controllable through a linkage arrangement in which there is embodied a "lost motion" linkage. The latter has the effect of limiting the degree to which the throttle of the engine can be opened through the action of the normal accelerator pedal or the like in the event that the driver of the vehicle is driving in an undesirable manner, in any one of many different respects which can be chosen by an owner or operator of the vehicle.

In my said earlier patent the "lost motion linkage", as the linear link is therein termed, is of a relatively clumsy nature and has a solenoid operated part carried by a plunger of the solenoid movable at right angles to the length of the link itself. A lost motion linkage of this type is of an awkward shape and may be difficult to install due to the fact that it may foul other engine components in consequence of its shape and size.

It is the object of this invention to provide a linear link of a nature capable of replacing the lost motion linkage referred to in my earlier patent and which may be utile in other applications and wherein a more compact linear link assembly is provided.

SUMMARY OF THE INVENTION

In accordance with this invention there is provided a linear link assembly comprising a linear outer member and collinear inner member telescopically movable relative thereto between terminal positions which define a degree of lost motion; formations in adjacent zones of the inner and outer members and located to correspond in linear position at one terminal position of said degree of lost motion; one or more catch elements for releasably co-operating with said formations when in alignment to selectively permit or prevent lost motion; a retainer member movable axially relative to the link for selectively urging the catch elements into engagement with the formations in at least one of the members; and a co-axial solenoid coil for controlling the operation of the retainer member.

Further features of the invention provide for the formations to be, in the case of the inner member, a circumferential groove in the outer surface thereof, the inner member conveniently being in the form of a rod; for the formations in the case of the outer member to be a plurality of apertures through the wall of the outer member and corresponding, in one terminal position of the members of the link, to the groove; for the elements to be loose elements, conveniently balls, held captive in the apertures in the outer member and being capable of being urged into the groove in the inner member to lock the two members against relative axial movement; for the retainer member to have an inner truncated conical surface for urging the elements radially into engagement with formations in the inner member; and for the solenoid to be located immediately adjacent the retainer member to either hold it in a position in which it urges the catch elements into their operative position or to release it for enabling the catch elements to move radially outwardly and allow for said lost motion to take place.

Still further features of the invention provide for the degree of lost motion to be adjustable, conveniently be means of an axially adjustable stop; for the axially adjustable stop to be associated with an end of the inner member; for the inner and outer members to be spring biased relative to each other towards a position in which the formations are in their co-operating positions; for the retainer member to be lightly spring biased towards a position in which the catch elements are urged radially inwardly; and for the lost motion to be either an extension or a contraction of the length of the linear link.

The invention still further provides that a coupling member be associated with an opposite end of each of the inner and outer members for coupling the linear link assembly, at opposite ends, into an operative position, the coupling members each being selectively connectable to each of the two opposite ends of the linear link to the outer or inner member as the case may be, such that, in the one arrangement of the coupling members the linear link assembly is adapted to collapse upon release of the catch members and, in the other arrangement of the coupling members, the linear link assembly is adapted to extend upon release of the catch members.

The coupling members may be provided with means for locking them in position relative to the associated inner or outer member and said means can conveniently be a locking screw such as a grub-screw.

The invention also provides a motor vehicle fuel supply control arrangement in which a linear link as defined above is included for selectively limiting, by virtue of said lost motion, the degree to which the fuel supply means or throttle can be opened, according to selected criteria.

In order that the invention may be more fully understood, two embodiments thereof will now be described with reference to the accompanying drawings.

BRIEF DESCRIPTION OF THE DRAWINGS

In the drawings:

FIG. 3 illustrates an alternative embodiment of the invention the coupling members associated with specific ends of the inner and outer members to provide for extension of the linear link assembly upon release of the catch members; and FIG. 4 illustrates the same embodiment of the invention but with the coupling members attached to opposite ends of the inner and outer members such that the linear link assembly will retract in length upon release of the catch members.

DETAILED DESCRIPTION WITH REFERENCE TO THE DRAWINGS

In the embodiments of the invention illustrated a linear link 1 is embodied in a linkage arrangement (generally indicated by numeral 2) between a foot operated accelerator pedal 3 and a diesel fuel pump 4 for a diesel engine (not shown) of a motor vehicle (also not shown).

Figure 1:
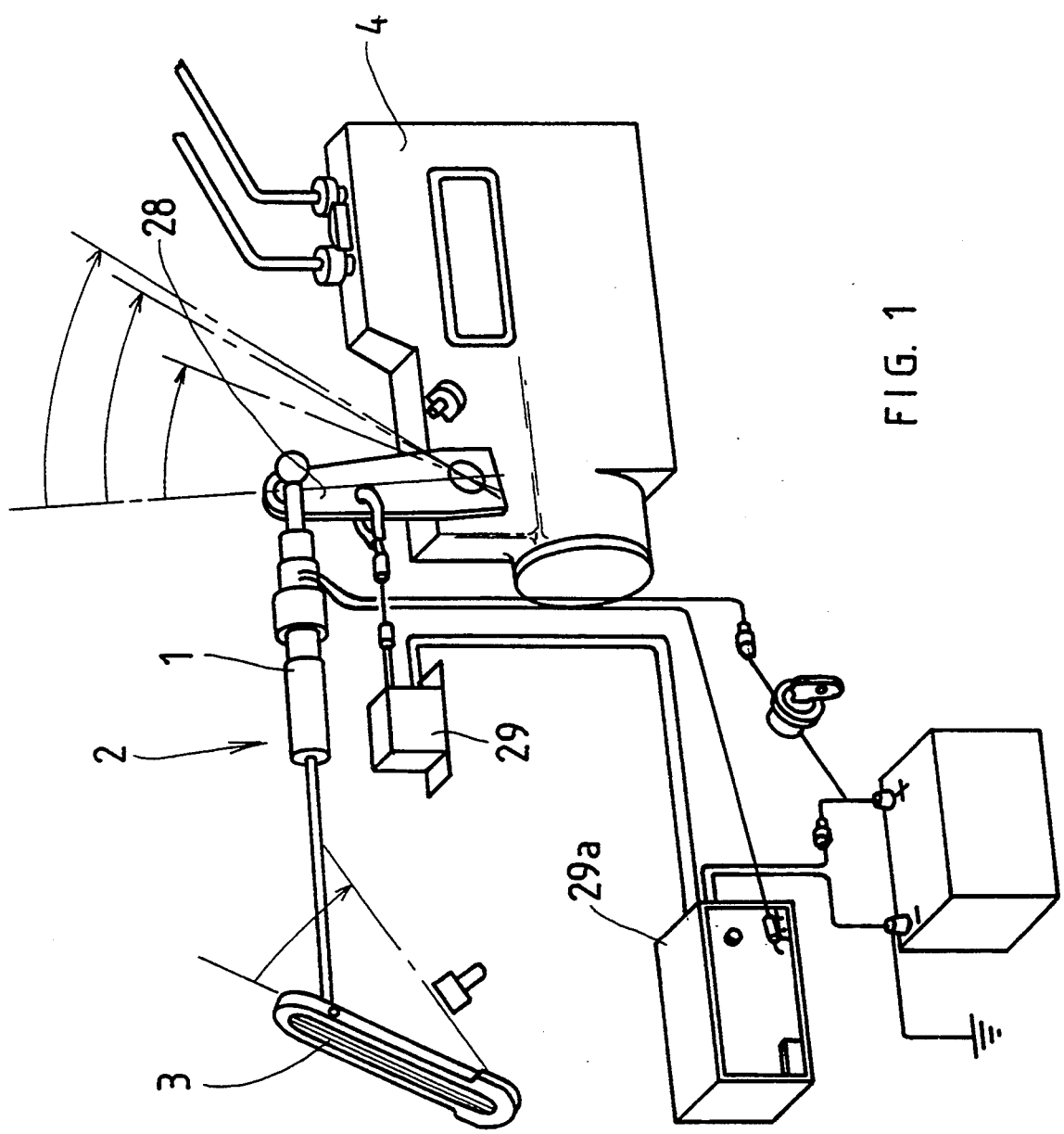
FIG. 1 is a schematic illustration of a motor vehicle throttle linkage arrangement associated with a diesel pump.
Figure 2:
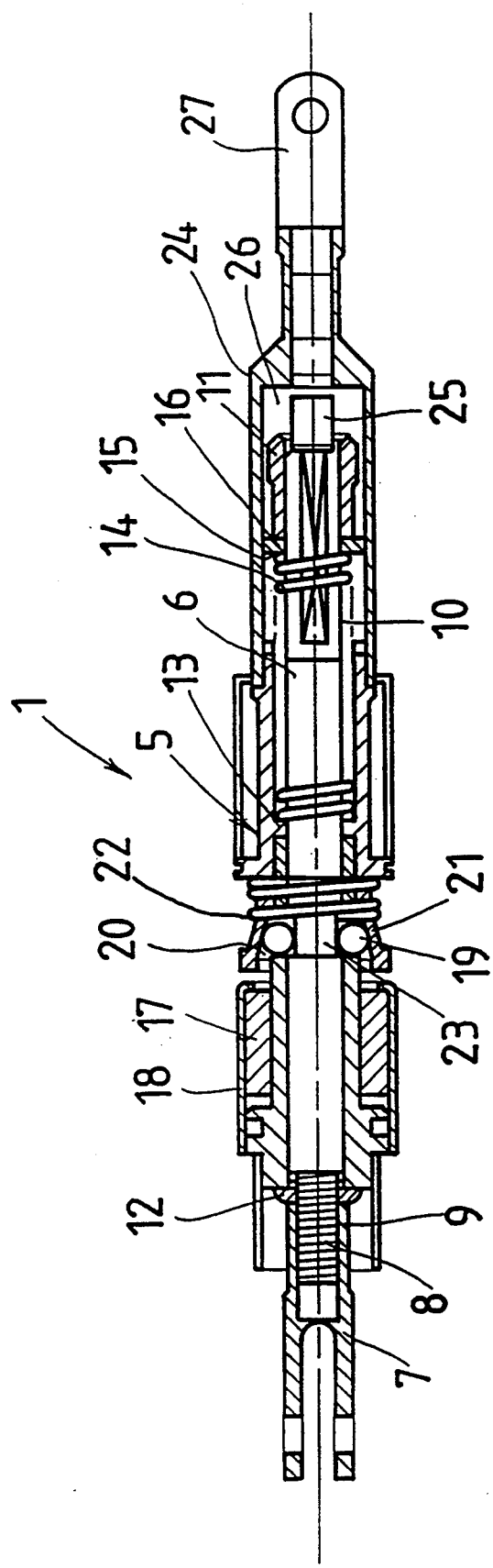
FIG. 2 is an enlarged longitudinal sectional elevation of one form of linear link assembly which may be embodied in the throttle linkage arrangement.

In the arrangement illustrated in FIG. 2, the linear link is of a nature adapted to be in tension when the accelerator pedal is depressed in order to increase fuel flow to the engine. It will be understood by those skilled in the art that there are numerous arrangements in which a linear link of this nature may be in compression in order to open the throttle of an engine and, in such a case, as described below, the linear link would be modified from that described with reference to FIG. 2 and the correct arrangement would be employed of the embodiment of the invention illustrated in FIGS. 3 and 4.

Referring now more particularly to FIG. 2, the linear link 1 comprises basically a composite outer member 5 having a longitudinal bore therethrough and within which is telescopically movable an inner member 6 in the form of a rod.

The inner member has, at its one end, a bifurcated first coupling member 7 secured thereto by means of a screw-threaded spigot 8 extending into a complimentarily screw-threaded socket 9 on the first coupling member. At the other end of the inner member, is a screw-threaded zone 10 on which is located a complimentarily screw-threaded stop member 11 which is axially adjustable in position. In the absence of the arrangement hereinafter described, the outer member is freely movable between a position in which its extremity adjacent the bifurcated first coupling member 7 abuts a fixed stop 12 on the spigot 8, and a position in which an inwardly directed flange 13 is prevented from moving off the free end of the rod by the adjustable stop 11.

The limits of movement are, in fact, modified by the presence of a light compression spring 14 extending between the flange 13 and adjustable stop 11. This spring urges the inner and outer members towards their axially contracted positions in which the end of the outer member abuts the fixed stop 12. There may also be included at a position indicated by numeral 15, between the end of the spring 14 and adjustable stop 11, a resiliently flexible shock absorbing sleeve (not shown) simply to cushion the impact between the adjustable stop 11 and spring when it is fully compressed as the linear link reaches its fully extended position. A lock nut 16 is provided for locking the adjustable stop 11 in any required position and the lock nut is, in this case, located between the spring 14 and adjustable stop 11.

The outer member carries, on the outside thereof, and towards the end adjacent the first coupling member 7, a co-axial solenoid coil 17 which is provided with a cover 18.

Axially adjacent the solenoid coil 17 the wall of the outer member is provided with four equally angularly spaced perforations which serve to locate four steel catch elements in the form of spherical balls 19. These balls are held captive on the outside by an inner truncated conical surface 20 of an axially movable retainer member 21. The truncated conical surface 20 of the retainer member is directed with the larger end towards the solenoid coil 17 and a light spring 22 urges the retainer member towards the solenoid coil.

In the telescopically contracted condition of the linear link (as illustrated in FIG. 2) the inner member has a circumferential groove 23 in the outer surface thereof in a position exactly opposite the steel balls 19. The latter are thus urged by the retainer member 21 into engagement with the groove.

This arrangement is such that when the solenoid 17 is de-energised, the strength of the spring 22 is insufficient to prevent the operative axial tension on the linear link from moving the balls 19 out of the groove. Accordingly, the linear link can extend thereby providing lost motion between the two ends to an extent dictated by the axial position of the axially adjustable stop 11. In the de-energised condition of the solenoid, the linear link exhibits the predetermined amount of lost motion in the axial direction.

However, with the solenoid 17 energised and acting on the retainer member 21 (which is of a magnetic nature), the retainer member is maintained in its operative position in which the balls 19 are engaged in the groove 23 in the inner member. Accordingly, by virtue of the engagement of the balls with the apertures in the outer member and groove in the inner member, the inner and outer member move in unison. No lost motion is thus present in the latter condition of the retainer member and solenoid.

The outer member is provided at its end opposite the first coupling 7 with a sleeve 24 extending beyond the free end 25 of the inner member and having large cutouts 26 to provide access to the adjustable stop 11. The sleeve 24 terminates in a second coupling member 27 forming the end of the linear link opposite the first coupling member 7.

It will be understood that, in use, and in the application of the invention to limiting the available movement of the accelerator arm 28 of a diesel pump, the installation includes a sensor 29 for sensing movements of the accelerator pedal 3 and a control unit 29a for controlling the electrical supply to the solenoid. The sensor and control circuit are adapted to ensure that the electrical supply to the solenoid is terminated when movements of the accelerator pedal which correspond to chosen abusive driving actions are sensed.

Thus, when a vehicle is being driven normally and correctly, the solenoid will be energised and, accordingly, the slave or second coupling 27 of the link will move in unison with the first coupling 7 in the manner of a rigid, inextensible link. This is so by virtue of the fact that the retainer member 27 is drawn towards the solenoid 17 to firmly hold the catch elements or spheres 19 in engagement in the groove 23 of the inner member.

However, upon the detection of undesirable or other abusive driving habits or actions of a driver of a vehicle, the solenoid becomes de-energised thereby enabling the axial force on the linear link to cause the catch elements or spheres 19 to move radially outwardly and allow relative telescopic movement between the inner and outer members of the linear link. The extent of this linear movement is dictated by the axial position of the adjustable stop 11. During axial extension of the linear link, the compression spring 14 becomes compressed completely and, where a resilient shock absorbing sleeve is present, this will act to cushion any shock in the event that the extension, by virtue of the lost motion, occurs suddenly.

It will be understood that the linear link described above will operate effectively in use and will be appreciably less cumbersome, and accordingly more easily accommodated within an engine compartment, than the lost motion linkage described in my said earlier patent.

In the event that a linear link in which the lost motion causes a contraction of the length of the linear link (in cases where the linear link is in compression under conditions of open throttle) all that is required is for the adjustable stop to be relocated to the opposite end region of the inner member and the groove 23 to be relocated in the length of the inner member so that locking of the telescopically movable inner and outer members relative to each other occurs at the maximum degree of extension (rather than the minimum as in the case described above) and the inner member moves further into the outer member upon de-energisation of the solenoid coil.

It is also possible to manufacture a single unit which can simply be re-arranged to provide for lost motion in tension or compression, as the case may be. Such an embodiment of the invention is illustrated in FIGS. 3 and 4 of the drawings.

In this case the peripheral groove 30 is located centrally between the two ends 31 of the rod 32. The two ends 31 are each screwthreaded for a distance inwardly from the end and are provided flat surfaces 33 for co-operating with a grub-screw 34 on a first coupling 35.

The first coupling 35 has a screwthreaded socket 36 for accommodating a screwthreaded end 31 of the rod and a second socket 37 for connection to a linkage member (not shown). The first coupling can therefore be screwed onto either end of the rod 32.

On the other hand, the outer member 38 has associated therewith a substantially tubular second coupling 39 having a screwthreaded socket 40 at one end and a spigot 41 at the opposite end for connection to a lever or the like. The screwthreaded socket 40 is adapted to co-operate with an external screwthread 42 on each end of the outer member so that the second coupling can be selectively associated with either end of the outer member.

The inner and outer members may be releasably locked together by means of catch members in the form of spherical balls 43 in the manner described in respect of the aforegoing embodiment and the control mechanism for such balls 43 thus comprises a retainer member 44 urged axially towards a solenoid 45 by a light spring 46. The light spring 46 is, without the assistance provided when the solenoid 45 is energised, unable to withstand axial movement of the retainer member 44 caused by release of the balls 43 from the groove 30, whilst with the solenoid energised, the rod 32 is unable to move axially relative to the outer member by urging the balls outwardly.

Turning now to the specific feature of this embodiment, it is to be noted from FIGS. 3 and 4 that, in the two figures, the first and second couplings 35 and 39 are located at opposite ends of the assembly. Thus, in the case of the arrangement illustrated in FIG. 3, in which the first coupling 35 is at the left hand side of the assembly and the second coupling 39 is at the right hand side, an adjustable stop nut 47 is placed on the screwthreaded end 31 of the rod opposite the coupling 35. This nut co-operates with a resilient washer 48 and serves to limit the movement of the rod out of the outer member 38 in a direction towards the left by engagement with the one end 49 of the outer member 38 itself. In this case, it can be seen that the lost motion upon release of the catch assembly provides for extension of the linear link.

The inner and outer members are biased by means of a light compression spring 50 to the collapsed position in which the first coupling 35 abuts the end of the outer member 38 nearest the solenoid 45 to limit the degree of collapse of the linkage and thus biases the inner and outer members, by co-operation with an adjustable stop nut 47 on the end of the rod, towards the retracted position in which the catch can be operative.

In the other arrangement illustrated in FIG. 4, where the first coupling 35 is at the right-hand side of the drawing and the second coupling 39 at the left hand side, the stop nut 47 is again located on the opposite end of the rod from the coupling 35. In this case the coupling 35 is again adapted to move towards the left hand side when the catch assembly is released and, this being so, the effective length of the linear link will decrease, or the link will contract upon release of the catch and, of course, under compression.

In this case the coupling 35 itself serves as the adjustment of the degree of lost motion provided as the adjacent end of the coupling 35 co-operates with the end 49 of the outer member to limit the degree of collapse of the link assembly. In this case the spring 50 is positioned between the blind end of the second coupling 39 and the nut 47 to urge the linear link assembly to its extended position in which the catch may be operable.

It will be understood that the embodiment of the invention described above operates in the same way as is described with reference to FIG. 2 save for the fact that the linear link assembly can be employed in accelerator assemblies in which compression or tension is applied to a linkage in which the linear link is embodied. All that is required in order to change from one type to the other is to swop the ends of the inner and outer members to which the first and second couplings 35 and 39 are attached and to shift the spring 21 to the appropriate position.

Numerous other arrangements are possible within the scope of the invention. In particular, the nature of the catch elements can be varied widely and, indeed, such elements could be of a spring loaded, saw-tooth type. Also, the retainer member may be physically attached to a movable core or sleeve associated with the solenoid in a more positive mechanical fashion although it has been found perfectly adequate to simply allow the magnetic field to act on the retainer member in the manner described above.

The invention therefore provides a simple yet effective and compact linear link assembly which provides for lost motion between the two ends thereof under selected conditions.

What I claim as new and desire to secure by Letters Patent is:

1. A linear link assembly comprising a linear outer member and collinear inner member telescopically movable relative thereto between terminal positions which define a degree of lost motion; formations in adjacent zones of the inner and outer members and located to correspond in linear position at one terminal position of said degree of lost motion; one or more catch elements for releasably cooperating with said formations when in alignment to selectively permit or prevent said lost motion; a retainer member movable axially relative to the link for selectively urging the catch elements into engagement with the formations in at least one of the members; an axial adjustable stop defining another terminal position for adjusting an extent of lost motion; and a coaxial solenoid coil for controlling the operation of the retainer member.

2. A linear link assembly as claimed in claim 1 in which, in the case of the inner member, the formations are constituted by a circumferential groove in the outer surface thereof.

3. A linear link assembly as claimed in claim 1 in which, in the case of the outer member, the formations are constituted by at least one aperture through the wall of the outer member and adapted, in one terminal position, to align with the formations in the inner member, the aperture serving to locate a catch element associated therewith.

4. A linear link assembly as claimed in claim 3 in which there are a plurality of apertures through the wall of the outer member, the apertures being equally angularly spaced and each serving to locate a separate catch element.

5. A linear link assembly as claimed in claim 4 in which each catch element is a loose element held captive relative to its associated aperture in the outer member, and is capable of being urged into the formations in the inner member by the retainer member to selectively lock the two members against relative axial movement.

6. A linear link assembly as claimed in claim 5 in which the loose elements are balls.

7. A linear link assembly as claimed in claim 6 in which the retainer member has an inner truncated conical surface for urging the catch elements radially into engagement with formations in the inner member.

8. A linear link assembly as claimed in claim 1 in which the solenoid is located immediately adjacent the retainer member to either hold it in an operative position in which it urges the catch elements into the operative positions in the energised condition or release the retainer member to thereby enable the catch elements to disengage and allow relative movement of the inner and outer members to take place in the de-energised condition.

9. A linear link assembly as claimed in claim 1 in which the axially adjustable stop is associated with the inner member.

10. A linear link assembly as claimed in claim 1 in which the inner and outer members are spring biased relative to each other towards a position in which the formations are in their co-operating positions.

11. A linear link assembly as claimed in claim 8 in which the retainer member is spring biased towards a position in which the catch elements are operative.

12. A linear link assembly as claimed in claim 1 in which a coupling member is associated with an opposite end of each of the inner and outer members for coupling the linear link assembly, at opposite ends, into an operative position, the coupling members each being selectively connectable to each of the two opposite ends of the linear link to the outer or inner member as the case may be, such that in the one arrangement of the coupling members the linear link assembly is adapted to collapse upon release of the catch members and in the other arrangement of the coupling members, the linear link assembly is adapted to extend upon release of the catch members.

13. A linear link assembly as claimed in claim 12 in which each end of each of the inner and outer members is adapted to receive, selectively, its associated coupling member.

14. A motor vehicle fuel supply control arrangement in which a linear link assembly as claimed in claim 1 is included for selectively limiting, by virtue of said lost motion, the degree to which the fuel supply means or throttle can be opened according to selected criteria.

* * * * *